United States Patent
Sugiura et al.

[11] Patent Number: 5,193,429
[45] Date of Patent: Mar. 16, 1993

[54] VACUUM TYPE BRAKE BOOSTER

[75] Inventors: Yuzuru Sugiura, Anjo; Satoshi Kawasumi, Takahama, both of Japan

[73] Assignee: Aisin Seiki Kabushiki Kaisha, Kariya, Japan

[21] Appl. No.: 714,617

[22] Filed: Jun. 13, 1991

[30] Foreign Application Priority Data

Jun. 25, 1990 [JP] Japan ................................ 2-67084

[51] Int. Cl.$^5$ .............................................. F01B 25/02
[52] U.S. Cl. ......................................... 91/6; 91/369.1; 91/376 R
[58] Field of Search ............ 91/6, 376 R, 369.1–369.4

[56] References Cited

U.S. PATENT DOCUMENTS

| 3,364,818 | 1/1968 | Hager et al. | 91/376 R |
| 4,759,255 | 7/1988 | Shimamura | 91/376 R |
| 4,800,799 | 1/1989 | Nishii | 91/369.2 |

FOREIGN PATENT DOCUMENTS

61-202970  9/1986  Japan.

Primary Examiner—Edward K. Look
Assistant Examiner—F. Daniel Lopez
Attorney, Agent, or Firm—Oblon, Spivak, McClelland, Maier & Neustadt

[57] ABSTRACT

A vacuum type brake booster includes a housing including a front shell and a rear shell in which a constant negative pressure chamber and a variable pressure chamber are defined by a power piston and a diaphragm, a partition for dividing the variable pressure chamber into a first variable chamber next to the constant negative pressure chamber and a second variable chamber, a normally opened valve mounted on the partition for establishing or interrupting of the fluid communication an output rod movable together with the power piston, an input rod for urging the output rod, a valve mechanism disposed with in the power piston to be operated by the input rod and used for controlling the differential pressure between the constant negative pressure chamber and the variable pressure chamber by controlling the fluid communication of the second variable chamber with the constant negative pressure chamber and the atmosphere and a normally closed valve mounted on a rear shell and the partition and disposed between the first variable chamber and the atmosphere.

2 Claims, 1 Drawing Sheet

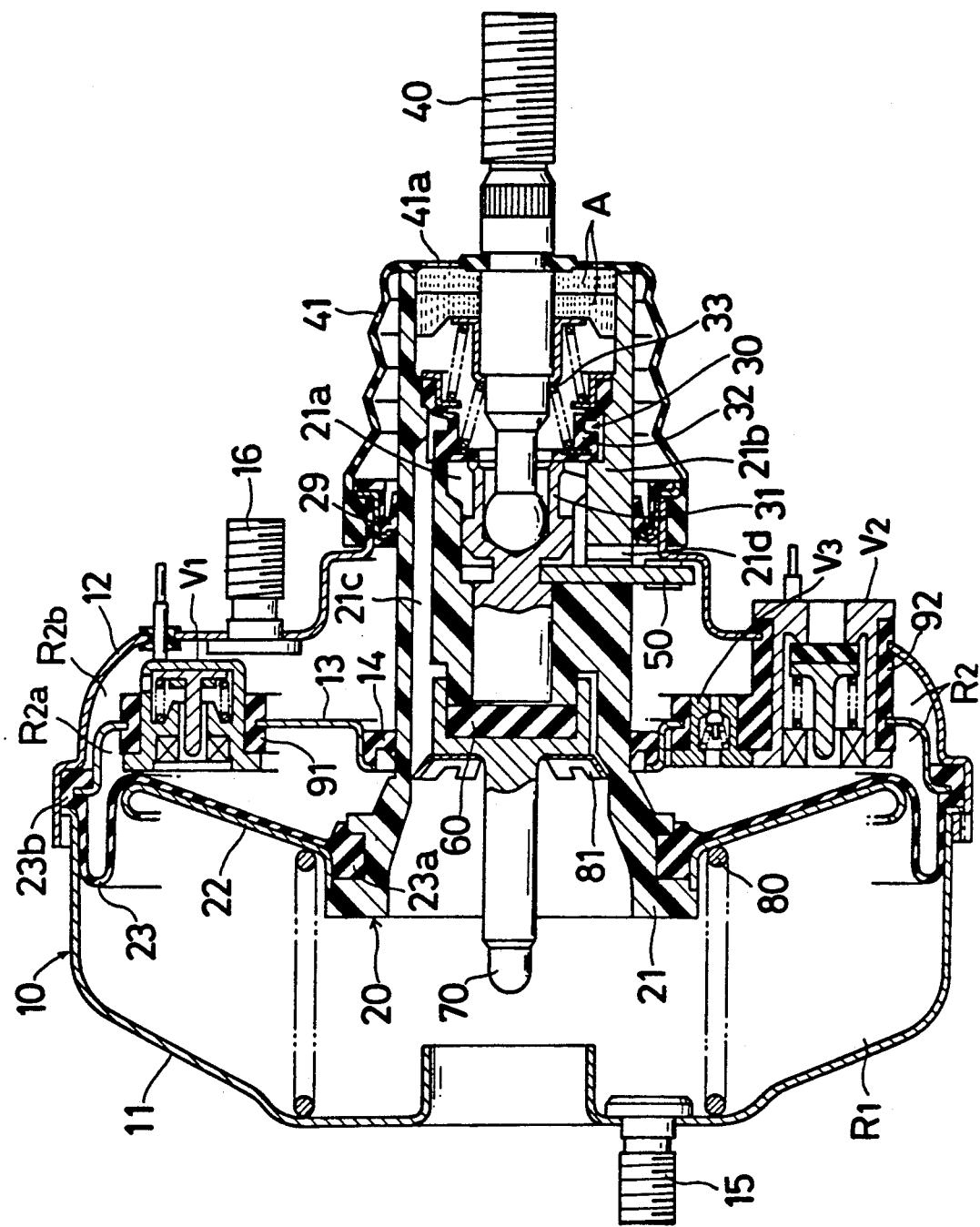

VACUUM TYPE BRAKE BOOSTER

BACKGROUND OF THE INVENTION

The present invention relates to a vacuum type brake booster for use in a brake mechanism of a motor vehicle.

One of the conventional brake boosters of the kind is disclosed in the U.S. Pat. No. 4,800,799 issued on Jan. 31, 1989. The conventional brake booster has a function wherein its operating condition is set to be held despite the release of the input rod. This function serves for the driver's easy brake operation.

In the conventional brake booster, a depression a brake pedal is required for operating the input rod. After a time which is required for the depression of the brake pedal, the desired brake operation is established. This means that it is difficult to realize a quick or emergency brake operation for the conventional brake booster.

SUMMARY OF THE INVENTION

It is, therefore, the principal object of the present invention to provide a vacuum type brake booster by which a quick or emergency brake operation can be realized.

Another object of the present invention is to provide a vacuum type brake booster which can be operated without depressing a brake pedal for realizing a quick or emergency brake operation.

In order to accomplish the foregoing objects, a vacuum type brake booster according to the present invention comprises the vacuum type brake booster comprising a housing including a front shell and a rear shell in which a constant negative pressure chamber and a variable pressure chamber are defined by a power piston and a diaphragm, the partition for dividing the variable pressure chamber into a first variable chamber next to the constant negative pressure chamber and a second variable chamber, a normally opened valve mounted on the partition for establishing or interrupting of the fluid communication, an output rod movable together with the power piston, an input rod for urging the output rod, a valve mechanism disposed with the power piston to be operated by the input rod and used for controlling the differential pressure between the constant negative pressure chamber and the variable pressure chamber by controlling the fluid communication of the second variable chamber with the constant negative pressure chamber and atmosphere and a normally closed valve is mounted on a rear shell and the partition and dispose the first variable chamber and the atmosphere.

BRIEF DESCRIPTION OF THE DRAWING

A single FIGURE is a cross-sectional view of a vacuum type brake booster according to the present invention.

DETAILED DESCRIPTION OF THE PREFERRED EMBODIMENT

Referring now to a single FIGURE, showing a single type vacuum booster which is one embodiment of the present invention, a housing 10 of the booster includes a front shell 11 and a rear shell 12. The front shell 11 is secured at its frontward potion (the left side in FIGURE) with a master-cylinder (not shown). The rear shell 12 is secured fluid-tightly to a rearward end potion of the front shell 11 and is connected at its rearward potion to a dash-board (not shown). An inner space of the housing 10 is divided into a constant negative pressure chamber R1 which is always kept at a negative pressure and a variable pressure chamber R2 by a power piston 20. In addition, the variable pressure chamber R2 is divided into a first variable chamber R2a which is next to the constant negative pressure chamber R1 and a second variable chamber R2b which is connected to the first variable chamber R2a via a normally opened valve V1 held by a partition 13.

The normally opened valve V1, which is designed to be operated according to an external signal, is mounted fluid tightly on the partition 13 via a sealing member 91. As shown in FIGURE, under the ordinary condition, the normally opened valve V1 serves for establishing fluid communication between the first variable chamber R2a and the second variable chamber R2b. The fluid communication between the chamber R2a and the chamber R2b is set to be interrupted upon the closure of the valve V1.

The partition 13 is in the form of an annular plate. An outer periphery of the partition 13 is fitted snugly, in a fluid-tight manner, in an outer bead portion 23b of diaphragm 23 which will be described later. An inner periphery of the partition 13 is provided with a sealing member 14, thereby assuring the fluid-tightness between the inner periphery of the partition 13 and an outer surface of a hub member 21 of the piston 20 despite axial movement thereof.

In addition, the front shell 11 is secured fluid-tightly with a bolt 15 for the connection thereof to the master-cylinder and a connecter (not shown) which is joined to intake-manifold as a vacuum source. The rear shell 12 is secured with a bolt 16 for the connection of the booster to the dash-board.

The power piston 20 comprises the hub member 21, the annular plate 22 and the diaphragm 23. The hub member 21 has a cylindrical portion 21a which extends outwardly of the housing 10 through a sealing member 29 and in which a valve mechanism is accommodated. The plate 22 and an inner bead potion 23a of diaphragm 23 are secured fluid-tightly on a stepped potion of the hub member 21. The diaphragm 23 is positioned at a rear-side of the plate 22, and an outer bead potion 23b of the diaphragm 23 is held in the fluid tight manner between a stepped portion of the rear shell 12 and a rear end potion of the front shell 11.

The valve mechanism 30 is designed to establish fluid communication between the second chamber R2b and the constant negative pressure chamber R1 or the atmosphere and includes a valve-plunger, a cylindrical valve 32 and related members.

The valve-plunger 31 is, after being assembled on a distal end potion of an input rod 40 to be operated by a brake pedal (not shown), inserted in the hub member 21 so as to be slidable in the axial direction thereof and is in engagement with a stopper 50.

The cylindrical valve 32, assembled in the cylindrical portion 21a of the hub member 21 at a rearward side of valve-plunger 31 and biased in the frontward direction by a spring 33, engages alternately a rear end face of the valve-plunger 31 or an inner stepped portion 21b of the hub member 21 according to the axial movement of the input rod 40.

In the valve mechanism 30, when the cylindrical valve 32 is first in engagement with the rear end face of the valve-plunger 31 and is spaced away from the inner stepped portion 21b (upon a rearward movement of the cylindrical valve 32), the fluid communication between the constant negative pressure chamber R1 and the second variable pressure chamber R2b is established via a hole 21c, cylindrical portion 21a and hole 21d in the hub member 21. When the cylindrical valve 32 is in engagement with the inner stepped portion 21b and is away from the rear end face of the valve-plunger 31 (upon forward movement of the cylindrical valve 32), the fluid communication between the second variable pressure chamber R2b and atmosphere is established by the hole 21d of the hub member 21, an inner portion of the cylindrical portion 21a, an inner hole of the cylindrical valve 32 and a hole 41a of the boot 41 which is disposed with an air-filter A, housing 10 and input rod 40.

Furthermore, a reaction-rubber-disc 60 and output rod 70 are assembled a front end portion of the power piston 20. The reaction-rubber-disc 60 is accommodated in a rear end cylindrical portion which is engagement with a piston (not shown) of the master-cylinder (not shown). The front face of the power-piston 20 is in engagement with the spring 80 and is used for the bias thereof in the rearward direction and is provided with a retainer 81 which serves for the connection of the output rod 70 to the power piston 20.

A normally closed valve V2 is fixed to the rear shell 12 and the partition 13 while passing through the last two members. As well as a check valve V3 is fixed to the partition 13 after being passed therethrough.

The normally closed valve V2, which is designed to be operated according to an external signal, is mounted fluid-tightly on the rear shell 12 and the partition 13 via a sealing member 92. Though as shown in FIGURE, under the ordinary condition, the normally closed valve V2 serves for the interruption of the fluid communication between the first variable pressure chamber R2a and the atmosphere, when the normally closed valve V2 is opened, the fluid communication between the first variable pressure chamber R2a and the atmosphere is set to be established. The check valve V3 is so designed as to permit the fluid flow from the second variable pressure chamber R2b to the first variable pressure chamber R2a regardless of the closure of the normally opened valve V1 and is mounted fluid-tightly on the partition 13 via the sealing member 92.

In operation, under the condition wherein an operating force applied to the input rod 40 is set to be transmitted to the output rod 70 after being boosted by the power piston 20, when the normally opened valve V1 is closed by the external signal, the fluid communication between the first variable chamber R2a and the second variable chamber R2b is interrupted resulting in that the pressure in the first variable chamber R2a is kept as it is, and a differential pressure between the first variable chamber R2a and the constant negative pressure chamber R1 in spite of the release of the operating force is maintained which leads to the maintenance of the foregoing condition. When the input rod 40 is moved further in order to introduce air into the second variable chamber R2b, the resulting air then enters the first variable chamber R2a via the check valve V3, the foregoing differential pressure is increased and the force applied to the output rod 70 is increased. It is noted that the foregoing condition can be released by establishing communication between the first variable chamber R2a and the second variable chamber R2b by opening the normally opened valve V1 which is done by another external signal.

On the other hand, under the condition wherein the input rod 40 is not operated, upon closure of the normally opened valve V1 and opening of the normally closed valve V2 both of which are done simultaneously by the external signals, communication of the first variable chamber R2a with the second variable pressure chamber R2b is interrupted and the chamber R2a is brought into fluid communication with atmosphere, thereby generating the differential pressure between the first variable chamber R2a and the constant negative pressure chamber R1. Then, due to the resulting differential pressure, the power piston 20 is brought into operation resulting in the movement of the output rod 70 toward the master cylinder. The resulting condition can be released by changing the fluid communication of the first variable chamber R2a from the atmosphere to the second variable chamber R2b upon opening of the normally opened valve V1 and closure of the normally closed valve V2 both of which are done simultaneously by the external signals the first variable chamber R2a is then isolated from the atmosphere and is brought into fluid communication with the second variable chamber R2b.

As apparent form the foregoing description, the booster according to one embodiment the present invention has two functions—the pause brake function wherein operation occurs after manipulation of the input rod 40 and the auto brake function wherein operation can be realized without operating the input rod 40.

It should be noted that in order to provide the auto brake function the normally closed valve V2 is added to the conventional booster having only the pause brake function established by the partition 13 and the normally opened valve V1 is such a manner that the normally closed valve V2 is secured to the partition 13 and is related to the normally opened valve V1.

Obviously, numerous modifications and variations of the present invention are possible in light of the above teachings. It is therefore to be understood that within the scope of the appended claims, the invention may be practiced otherwise than as specifically described herein.

What is claimed is:

1. A vacuum type brake booster comprising:
    a housing including a front shell and a rear shell in which a constant negative pressure chamber and a variable pressure chamber are defined by a power piston and a diaphragm;
    a partition for dividing the variable pressure chamber into a first variable chamber next to the constant negative pressure chamber and a second variable chamber;
    a normally opened valve mounted on the partition for establishing or interrupting fluid communication;
    an output rod movable together with the power piston;
    an input rod for urging the output rod;
    a valve mechanism disposed with in the power piston to be operated by the input rod and used for controlling the differential pressure between the constant negative pressure chamber and the variable pressure chamber by controlling the fluid communication of the second variable chamber with the constant negative pressure chamber and the atmosphere;
    a normally closed valve mounted on a rear shell and the partition and disposed between the first variable chamber and the atmosphere; and
    a check valve which permits the fluid flow from the second variable pressure chamber to the first variable pressure chamber.

2. A vacuum type brake booster according to claim 1, wherein said normally closed valve is operated according to an external signal.

* * * * *